United States Patent
Stiesdal et al.

(10) Patent No.: US 7,059,833 B2
(45) Date of Patent: Jun. 13, 2006

(54) METHOD FOR IMPROVEMENT OF THE EFFICIENCY OF A WIND TURBINE ROTOR

(75) Inventors: Henrik Stiesdal, Odense C (DK); Peder Bay Enevoldsen, Vejle (DK)

(73) Assignee: Bonus Energy A/S, Brande (DK)

( * ) Notice: Subject to any disclaimer, the term of this patent is extended or adjusted under 35 U.S.C. 154(b) by 263 days.

(21) Appl. No.: 09/991,781

(22) Filed: Nov. 26, 2001

(65) Prior Publication Data

US 2003/0099546 A1 May 29, 2003

(51) Int. Cl.
  *F03O 1/06* (2006.01)
(52) U.S. Cl. .................. 416/41; 416/62; 416/132 B; 416/228; 416/236 R; 416/237; 416/240; 29/889.3; 29/889.6; 29/889.7
(58) Field of Classification Search .......... 416/228, 416/236 R, 237, 62, 240, 23, 41, 44, 131, 416/132 B; 29/889, 889.2, 889.3, 889.6, 29/889.7, 889.71; 244/198–200, 201, 203
See application file for complete search history.

(56) References Cited

U.S. PATENT DOCUMENTS 175,355 A * 3/1876 King ........................ 416/228
1,724,456 A * 8/1929 Crook ...................... 244/203
5,088,665 A 2/1992 Vijgen et al.
5,533,865 A 7/1996 Dassen et al.

FOREIGN PATENT DOCUMENTS

DE 311416 A * 5/1919 ............. 416/123 B
DE 2527467 A1 * 12/1976 ............ 244/199

OTHER PUBLICATIONS

English translation of German Patent 311,416.*

* cited by examiner

*Primary Examiner*—Christopher Verdier
(74) *Attorney, Agent, or Firm*—James Creighton Wray; Meera P. Narasimhan

(57) ABSTRACT

A method for the improvement of wind turbine rotor efficiency blades of a wind turbine rotor with serrated trailing edges each having a plurality of span-wise, periodic indentations, in the form of saw teeth having approximately 60 degrees included angles between adjacent vertices. The efficiency of an existing wind turbine rotor is improved by the attachment of an apparatus to at least part of the trailing edge of the wind turbine blades, the apparatus being in the form of a serrated panel that is fixed to the surface of the blade and has the serrations extending into the airflow behind the trailing edge of the existing blade. The efficiency of a new wind turbine blade is improved by manufacturing the blade with serrations of at least part of the trailing edge of the wind turbine blade.

4 Claims, 5 Drawing Sheets

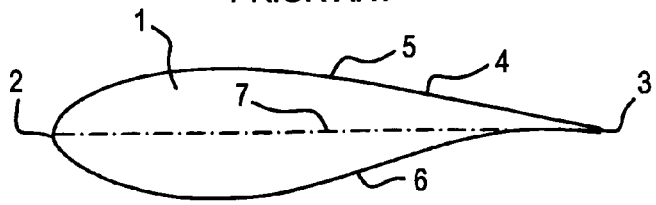
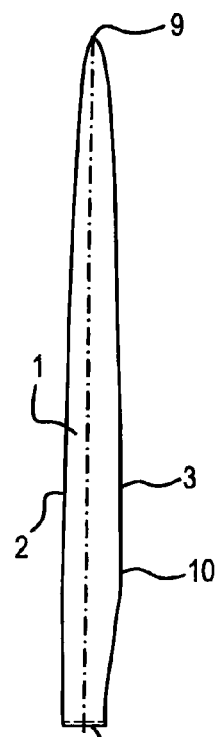
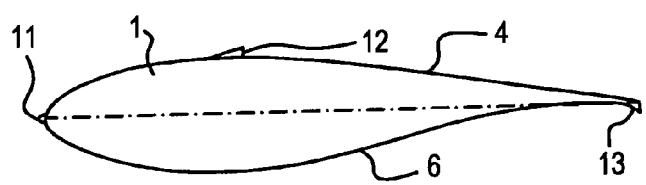
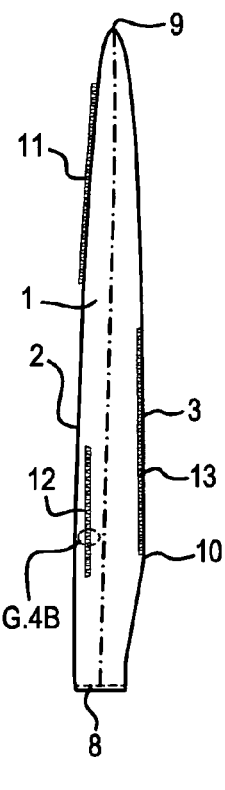
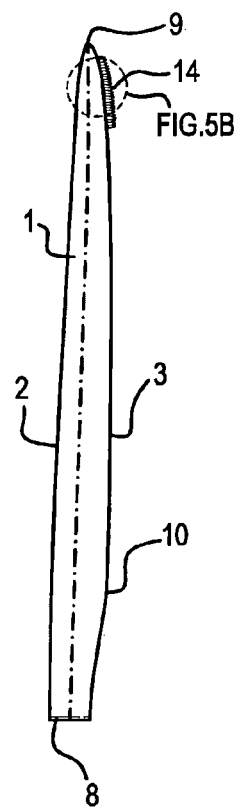
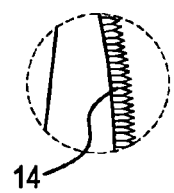

METHOD FOR IMPROVEMENT OF THE EFFICIENCY OF A WIND TURBINE ROTOR

BACKGROUND OF THE INVENTION

The present invention relates generally to the field of wind turbine aerodynamics, in particular to the optimizing of the energy output from a wind turbine rotor consisting of a plurality of blades.

Typically, the aerodynamic surfaces of wind turbine blades have sharp or moderately blunt trailing edges from which the wake is shed. The shedding of the wake and the confluence of flow from the pressure and suction sides of the profile are sources of aerodynamic noise, and increased drag and reduced lift.

For a wind turbine rotor of a given diameter it is possible to determine the total mechanical power available at a given wind speed. The efficiency of the wind turbine rotor at a given wind speed is the ratio between the shaft power and the total mechanical power available in the wind at that wind speed.

For everyday purposes the efficiency of a wind turbine rotor is displayed in the so-called power curve of the wind turbine. A power curve is a graph and/or a table of the electrical power output from the wind turbine as a function of the wind speed. For blade efficiency evaluations in absolute terms a mechanical power curve is necessary, since the efficiency of the wind turbine rotor at a given wind speed is the ratio between the shaft power and the total mechanical power available. The measurement of a mechanical power curve is difficult, however, requiring stable torque instrumentation on the rotating shaft of the turbine. Consequently, the rotor efficiency is commonly evaluated on the basis of the electrical power, thereby inherently including the effects of the losses in gearbox, generator and cables. For blade efficiency evaluations in relative terms this is sufficiently accurate, provided the gearbox, generator and cable losses are known and are kept unchanged during any modifications of the wind turbine rotor.

For the wind speed range that contributes most of the annual energy output the efficiency of a wind turbine rotor is a function of the ratio between lift and drag on the aerodynamic profiles of the blade. A high lift/drag ratio is preferred.

Certain aerodynamic profiles have shapes that provide lift/drag ratios above normal. These so-called laminar profiles are used e.g. on gliders that benefit from high lift/drag ratios. On wind turbines such profiles are not suitable, however, since they are very sensitive to surface contamination by e.g. insects or rain. Once contaminated their lift/drag ration drops to or below that of normal profiles.

Lift modifying devices have been used on wind turbine blades to improve the lift/drag ratio or otherwise adjust the aerodynamic characteristics of the blade. Common devices include stall strips, vortex generators and Gurney flaps. Generally, such devices have negative effects on drag, and trade-offs between lift and drag are normally expected.

Serrated trailing edges are known to improve the lift and drag characteristics of a lifting surface. Various embodiments are described in U.S. Pat. No. 5,088,665.

Serrated trailing edges are known to be used on wind turbines for noise reduction purposes. In such applications the serrations are usually limited to the outboard 10–20 percent of the span. An embodiment for noise reduction with hexagonal cross section of the serrations is described in U.S. Pat. No. 5,533,865.

A more general description of the use of serrated trailing edges on wind turbine blades with the purpose of noise reduction is presented in "Noise Reduction By Using Serrated Trailing Edges/K. A. Braun, N. v. d. Borg, T. Dassen, A. Gordner, R. Parchen", Proceedings of EWEC 97, Dublin 1997.

None of the above descriptions or uses of serrated trailing edges have been shown to improve wind turbine rotor efficiency, or have been used to improve or attempt to improve wind turbine rotor efficiency.

SUMMARY OF THE INVENTION

An object of the present invention is to provide a method for the improvement of wind turbine rotor efficiency.

Another object of the present invention is to provide embodiments for the improvement of wind turbine rotor efficiency.

These and other objects of the invention are met by providing the blades of a wind turbine rotor with serrated trailing edges each having a plurality of span-wise, periodic indentations, preferably in the form of saw teeth having approximately 60 degrees included angles between adjacent vertices.

In one manifestation of the invention, the efficiency of an existing wind turbine rotor is improved by the attachment of an apparatus to at least part of the trailing edge of the wind turbine blades, said apparatus being in the form of a serrated panel that is fixed to the surface of the blade and has the serrations extending into the airflow behind the trailing edge of the existing blade.

In another manifestation of the invention the efficiency of a new wind turbine blade is improved by manufacturing the blade with serrations of at least part of the trailing edge of the wind turbine blade.

The invention will be more fully described hereinafter with reference to the accompanying drawings forming a part hereof, wherein like reference numerals refer to like parts throughout.

These and further and other objects and features of the invention are apparent in the disclosure, which includes the above and ongoing written specification, with the claims and the drawings.

BRIEF DESCRIPTION OF THE DRAWINGS

FIG. 1 is a schematic, cross-sectional view of an aerodynamic profile commonly used on wind turbines.

FIG. 2 is a schematic, plan view of a typical wind turbine blade.

FIG. 3 is a schematic, cross-sectional view of a wind turbine blade fitted with lift modifying devices commonly used on wind turbines.

FIGS. 4A and 4B are schematic, plan views of a typical wind turbine blade fitted with lift modifying devices commonly used on wind turbines.

FIGS. 5A and 5B are schematic, plan views of a wind turbine blade fitted with serrated trailing edge as known applied for noise reduction purposes;

DETAILED DESCRIPTION OF THE PREFERRED EMBODIMENTS

Figure 6:
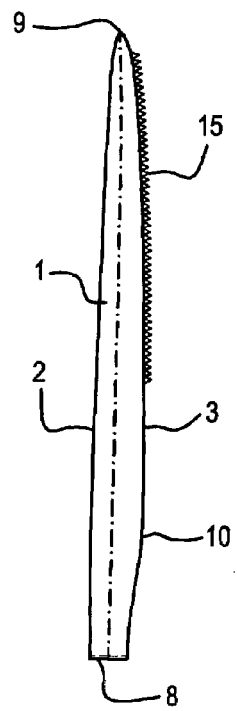
FIG. 6 is a schematic, plan view of a wind turbine blade fitted with serrated trailing edge for efficiency improvement purposes in accordance with the present invention.

FIG. 1 shows a schematic cross section of a wind turbine blade 1 having a leading edge 2, a trailing edge 3, and a lifting surface 4 between the leading edge and the trailing edge. The lifting surface has a more convex side 5 referred to as the suction side, and a less convex side 6 referred to as the pressure side. A chord 7 is an imaginary line drawn between the leading edge 2 and the trailing edge 3.

FIG. 2 shows a schematic plan view of a wind turbine blade 1 having a root end 8 and a tip end 9. The length of the blade from root to tip is referred to as a span. Parts of the blade near the tip are referred to as being outboard, and parts of the blade near the root are referred to as being inboard. The outboard part of the blade has an aerodynamically shaped cross-section, commonly with a profile belonging to one of numerous "families" of aerodynamic profiles used in the aeronautic industry. At the inboard part of the blade the aerodynamically shaped cross-section is commonly changed to a cylindrical cross-section at the root end. The transition from a profiled section to a circular section typically stretches from the radius of largest chord 10 to a point, normally referred to as the shoulder of the blade, to a point between the shoulder and the root.

FIG. 3 shows a schematic, cross-sectional view of a wind turbine blade 1 fitted with lift modifying devices commonly used on wind turbines. These devices comprise a stall strip 11, a vortex generator 12, and a Gurney flap 13. In most cases all of these types of lift modifying devices are not used simultaneously on any given section of the blade, but may be used on different sections.

FIGS. 4A and 4B are schematic, plan views of a typical wind turbine blade fitted with lift modifying devices commonly used on wind turbines. Typical spanwise locations of stall strips 11, vortex generators 12 and Gurney flaps 13 are shown.

FIGS. 5A and 5B are schematic, plan views of a wind turbine blade fitted with serrated trailing edge as known applied for noise reduction purposes. The serrations 14 are triangular in shape, of hexagonal cross-section and having a fairly sharp vertex angle, typically less than 30 degrees. The serrated part of the trailing edge is limited to the outboard part of the blade near the tip, having a length of typically 10–20 percent of the span.

FIG. 6 is a schematic, plan view of a wind turbine blade fitted with serrated trailing edge for efficiency improvement purposes in accordance with the present invention. The serrations 15 are here shown triangular in shape, of flat, rectangular or rounded cross-section and having a more blunt vertex angle than the serrations 14 for noise reduction, typically on the order of 60 degrees. The serrations may have other shapes, e.g. with rounded sides or other vertex angles than 60 degrees. The serrated part of the trailing edge is not limited to the outboard part of the blade near the tip, but has a length of typically 40–80 percent of the span.

Figure 7A:
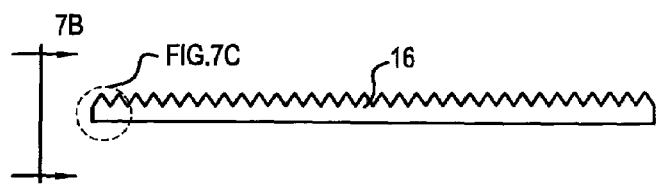
FIGS. 7A, 7B and 7C are enlargements of FIG. 6, showing some preferred dimensions of one type of serrated panel.
Figure 7B:
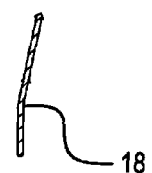
Figure 7C:
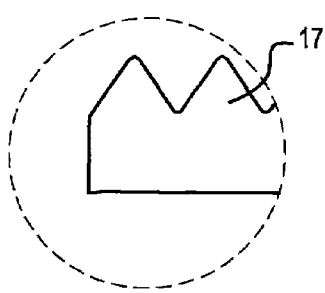

FIGS. 7A, 7B and 7C show a serration panel with some preferred dimensions of the serrations suitable for use on wind turbine blades of 20–50 m length. The serration panel 16 can be manufactured from a 1000×110 mm polycarbonate sheet. A serration tooth 17 can be an equilateral triangle with a height of 50 mm. The cross-section can be rectangular, with a thickness of 2 mm, and the panel can be bent along the long axis, the bend 18 having an angle of 15 degrees.

Figure 8A:
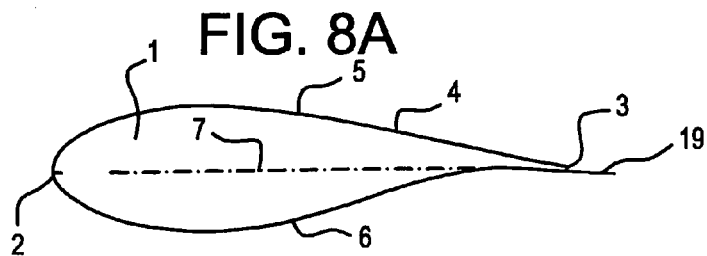
FIGS. 8A, 8B and 8C are schematic, cross-sectional views of the mounting of a preferred embodiment of the serrated panel on a wind turbine blade.
Figure 8B:
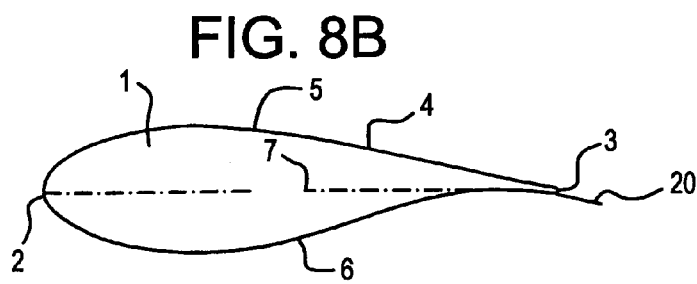
Figure 8C:
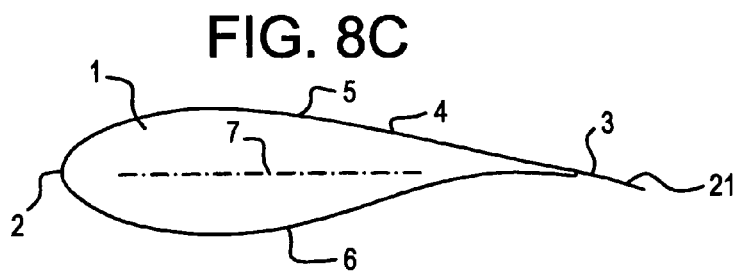

FIGS. 8A, 8B and 8C are schematic, cross-sectional views of the mounting of various preferred embodiments of the serrated panel on a wind turbine blade. A linear version of the panel 19 may be mounted on the pressure side 6 of the blade, projecting behind the trailing edge 3. A bent version of the panel 20 may also be mounted on the pressure side 6 of the blade, projecting behind the trailing edge 3, or a version 21 may be mounted on the suction side 5. The panel is manufactured in a material and thickness sufficient to ensure that the angle of the serrated part is generally unchanged irrespective of the speed and angle of the air flow at the trailing edge of the blade.

Figure 9A:
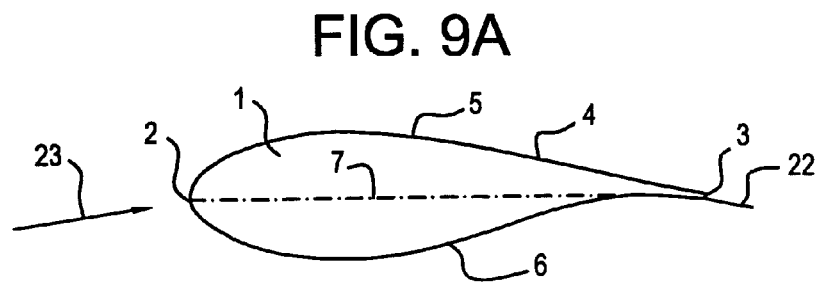
FIGS. 9A and 9B are schematic, cross-sectional views of the mounting of another preferred embodiment of the serrated panel on a wind turbine blade.
Figure 9B:
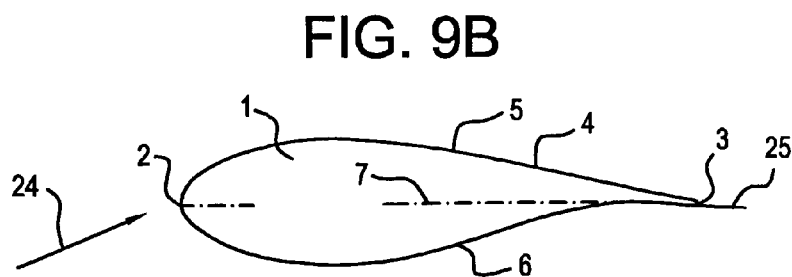

FIGS. 9A and 9B are schematic, cross-sectional views of the mounting of another preferred embodiment of the serrated panel on a wind turbine blade. The panel 22 is mounted on the pressure side 6 of the blade and is bent along its axis. The panel is manufactured in a material and thickness sufficient to ensure that the angle of the serrated part changes in response to the speed and angle of the air flow at the trailing edge of the blade. At a fairly low ambient wind speed giving a resulting wind speed vector 23 with a shallow angle to the chord 7 the shape of the panel is close to the shape when unloaded. At a higher ambient wind speed the resulting wind speed vector 24 has a larger angle to the chord 7, and the panel flexes to a new position 25 or to any other position within a range defined by the combination of the stiffness characteristics of the serrated panel and the range of aerodynamic forces in the operating wind speed range of the wind turbine. This means that by proper tuning of the stiffness characteristics of the serrated panel the aerodynamic properties of the serrated trailing edge may be automatically and instantaneously adjusted to the actual wind conditions in a manner that is particularly beneficial to the improvement of the efficiency of the wind turbine rotor.

Figure 10:
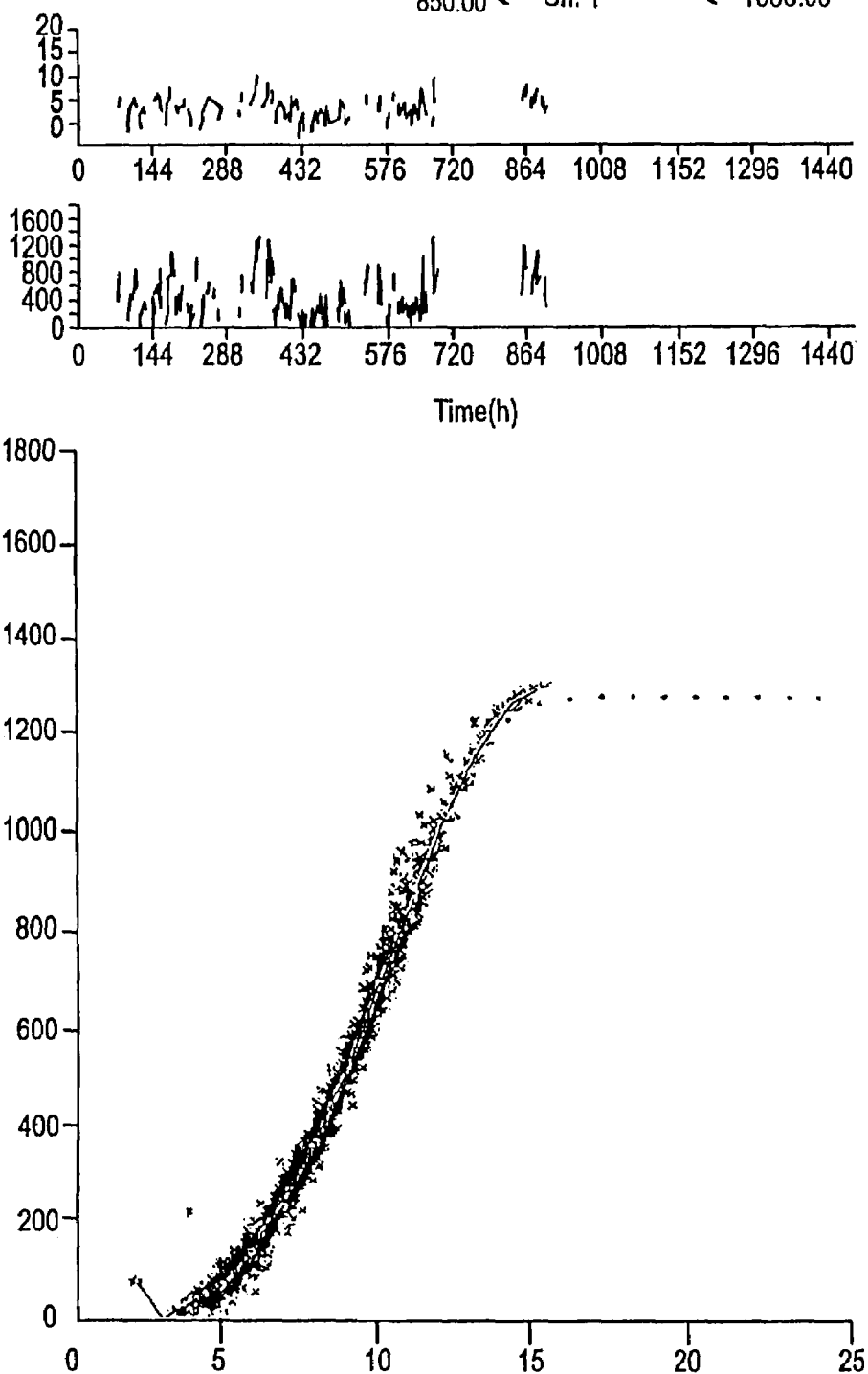
FIG. 10 is a plot of the measurement of the power performance of a wind turbine fitted with standard lift modifying devices commonly used on wind turbines.

FIG. 10 is a plot of the measurement of the power performance of a 1.3 MW wind turbine with 62 m rotor diameter, fitted with standard lift modifying devices commonly used on wind turbines.

Figure 11:
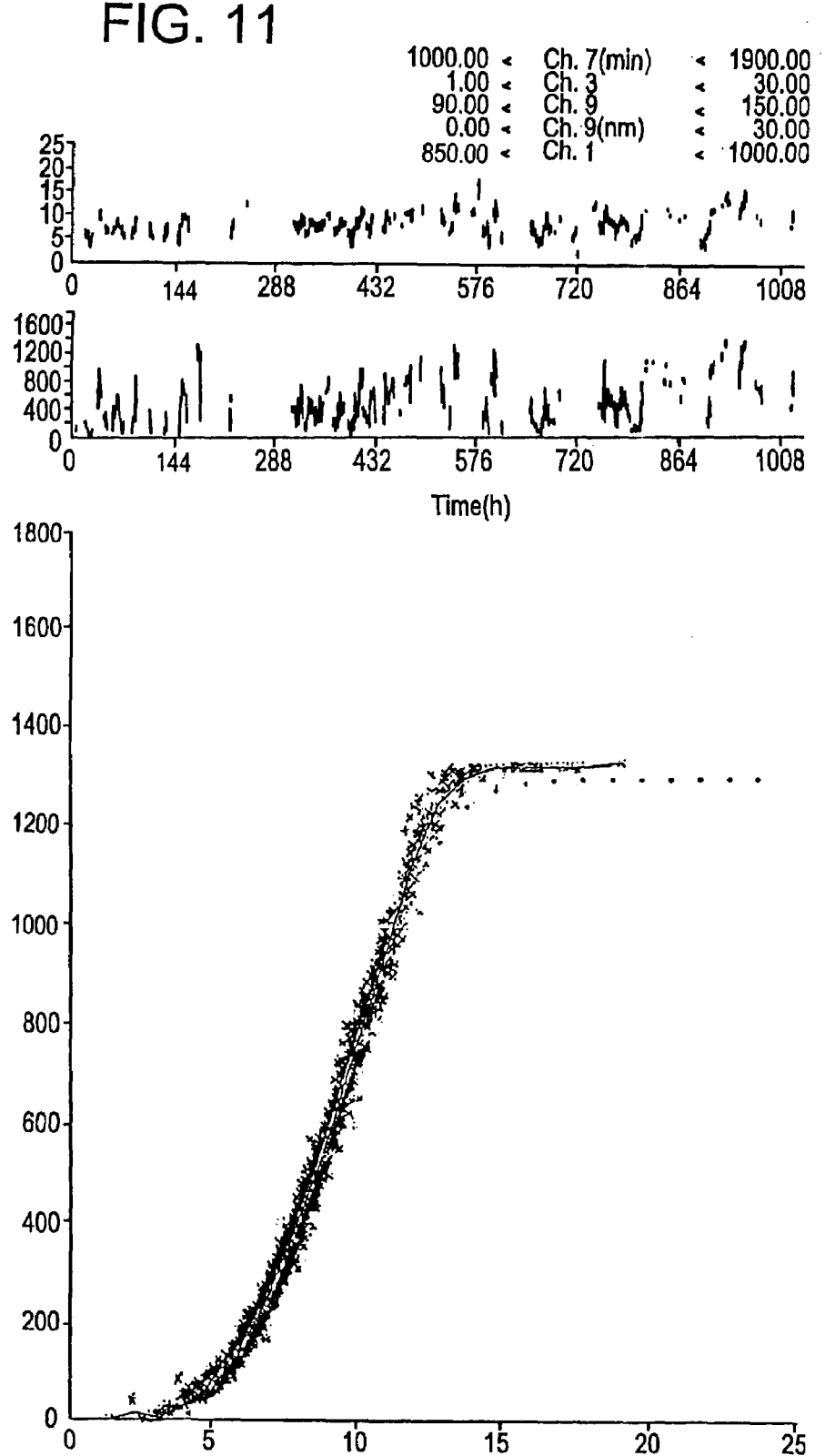
FIG. 11 is a plot of the measurement of the power performance of the same wind turbine as shown in FIG. 10 but fitted with serrated trailing edges in addition to the standard lift modifying devices.

FIG. 11 is a plot of the measurement of the power performance of the same wind turbine as shown in FIG. 10 but fitted with serrated trailing edges in addition to the standard lift modifying devices. The serrated edges were furnished as a retrofit with serrated panels, each panel being manufactured from 2 mm polycarbonate, having a length of 1000 mm and a width of 107 mm, and having serrations in the form of saw teeth having a height of 50 mm and 60 degrees included angles between adjacent vertices. The panels were mounted with double-adhesive tapes on the pressure side of the blade with 75 mm of the panel width (of which 50 mm were serrations) extending behind the trailing edge of the existing blade, over a spanwise extent from 50 percent radius to 90 percent radius. As a result the power curve has been shifted to the left at medium-high wind speeds, meaning that the annual energy output of the wind turbine has been improved. In the present example the improvement in annual energy output is about 4 percent. This improvement may lead to an increase in the annual energy production of about 150,000 kWh at a moderate wind site, corresponding to an increase in income of about $6000. The cost of the serrated trailing edge panels needed for this improvement in wind turbine efficiency is less than $100.

The many features and advantages of the present invention are apparent from the details of the specification, and thus, it is intended by the appended claims to cover all such features and advantages of the serrated panel which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and spirit of the invention.

While the invention has been described with reference to specific embodiments, modifications and variations of the invention may be constructed without departing from the scope of the invention, which is defined in the following claims.

We claim:

1. An apparatus for improving efficiency of a wind turbine rotor having wind turbine rotor blades comprising a serrated panel connected to each wind turbine rotor blade, an upper and a lower surface on each panel, a plurality of span-wise, periodic indentions on each panel, means for connecting the serrated panel to a trailing edge on each of the wind turbine rotor blades of the wind turbine rotor such that the serrated panel extends from the trailing edge into airflow behind the trailing edge on each wind turbine rotor blade of the wind turbine rotor, the serrations on each wind turbine rotor blade having an angle different from 0 degrees relative to a mounting surface on each of the wind turbine rotor blades of the wind turbine rotor, wherein the serrations and each of the serrated panels have a given stiffness allowing for an angle of the serrations to change passively in response to speed and angle of the airflow at the trailing edge of each of the wind turbine rotor blades due to flexing of the serrations and the serrated panel.

2. The apparatus of claim 1, wherein the serrations on each of the wind turbine rotor blades extend along a span-wise extent of the trailing edge having a length of between about 30 and 100 percent of a radius of the blade.

3. The apparatus of claim 1, wherein the serrations are saw-toothed serrations having approximately 60 degrees included angles between adjacent vertices.

4. The apparatus of claim 1, wherein the serrated panel further comprises saw-toothed serrations having approximately 60 degrees included angles between adjacent vertices.

* * * * *